(12) United States Patent
Nip

(10) Patent No.: US 6,555,075 B2
(45) Date of Patent: Apr. 29, 2003

(54) METHOD OF PREPARING ZINC CARBONATE

(76) Inventor: Raymond Lee Nip, 259 Sebastian Dr., Millbrae, CA (US) 94030

( * ) Notice: Subject to any disclaimer, the term of this patent is extended or adjusted under 35 U.S.C. 154(b) by 0 days.

(21) Appl. No.: 09/862,474

(22) Filed: May 23, 2001

(65) Prior Publication Data

US 2003/0031617 A1 Feb. 13, 2003

(51) Int. Cl.$^7$ ................................................ C01G 9/02
(52) U.S. Cl. ..................... 423/105; 423/622; 423/419.1; 423/497
(58) Field of Search ............................. 423/419.1, 105, 423/490, 357, 622, 140, 141, 142, 497; 75/10.3, 324, 724, 725, 738, 961

(56) References Cited

U.S. PATENT DOCUMENTS

| | | | |
|---|---|---|---|
| 3,929,598 A | * 12/1975 | Stern et al. | 205/581 |
| 4,071,357 A | 1/1978 | Peters | |
| 4,889,694 A | 12/1989 | Spink et al. | |
| 5,028,410 A | * 7/1991 | Spink et al. | 210/197 |
| 5,132,104 A | 7/1992 | Yamamoto et al. | |
| 5,204,084 A | * 4/1993 | Robinson et al. | 423/105 |
| 5,527,519 A | 6/1996 | Miksits et al. | |
| 5,538,532 A | 7/1996 | Keegel, Jr. | |
| 5,587,148 A | 12/1996 | Mitchell et al. | |
| 5,658,555 A | 8/1997 | Ascione et al. | |
| 5,750,609 A | 5/1998 | Nosu et al. | |
| 5,876,688 A | 3/1999 | Laundon | |
| 6,171,580 B1 | 1/2001 | Katsuyama et al. | |
| 6,200,680 B1 | 3/2001 | Takeda et al. | |
| 6,337,362 B1 | 1/2002 | Reynolds et al. | |
| 6,342,556 B1 | 1/2002 | Batdorf et al. | |

* cited by examiner

*Primary Examiner*—Steven Bos
*Assistant Examiner*—Anthony Kuhar
(74) *Attorney, Agent, or Firm*—Larson & Taylor, PLC

(57) ABSTRACT

A method for preparing basic zinc carbonate from die casting ash, zinc skimming or zinc ash includes heating urea or a mixture of urea and ammonia and carbon dioxide with water in a closed vessel with zinc ash. After zinc is dissolved in sufficient quantities, the solution is cooled and filtered. The filtered solution is cemented with zinc dust to precipitate heavy metals and the filtered. The solution is preferably heated a second time to remove an iron precipitate. The solution is then heated a third time to precipitate the dissolved zinc as basic zinc carbonate, which is washed and dried. The filtrate and gases recovered from the heating steps are reused in the process.

22 Claims, 1 Drawing Sheet

Preparation of Zinc Carbonate

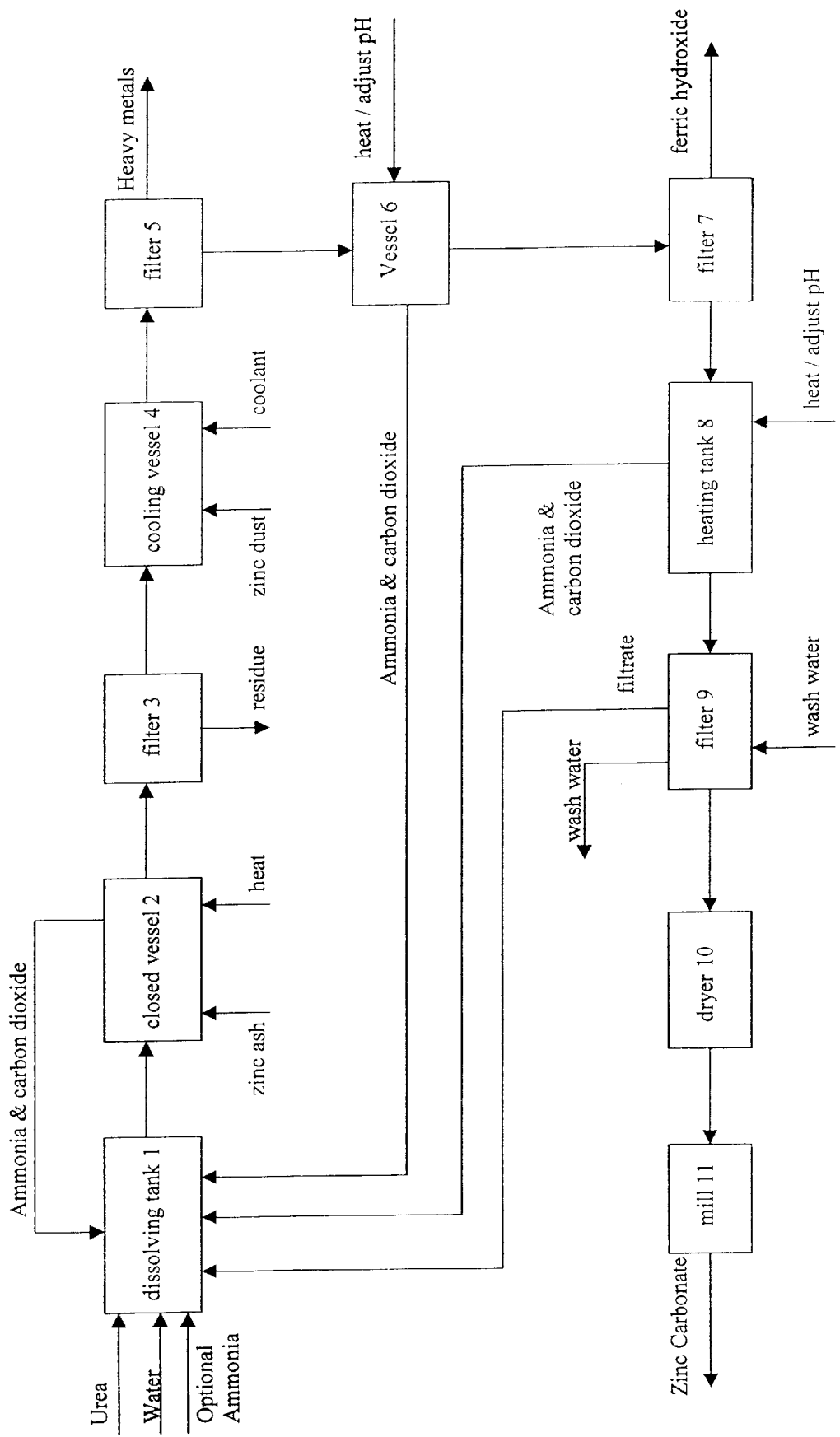

METHOD OF PREPARING ZINC CARBONATE

FIELD OF THE INVENTION

The present invention relates to the preparation of zinc carbonate, and in particular, to the preparation of zinc carbonate from zinc ash using urea.

BACKGROUND OF THE INVENTION

A substantial amount of zinc metal ends up as skimming or ash during the galvanizing process. In addition, there are other waste zinc materials from die casting and electric steel furnaces. All these zinc materials are contaminated to some extent with one or more of the following impurities: iron, lead, other heavy metals, aluminum, manganese, etc.

Zinc ash is traditionally used to make zinc chemicals which include zinc chloride and zinc sulphate. The markets for these chemicals are limited with little growth. The traditional method of using zinc sulphate and soda ash to make zinc carbonate or active zinc oxide from zinc ash is cumbersome and expensive.

For example, U.S. Pat. No. 4,071,357 teaches a process of recovering zinc value from steel making flue dust. In this process, a solution of ammonia and carbon dioxide is used to dissolve the zinc bearing flue dust.

One disadvantage with the method disclosed in U.S. Pat. No. 4,071,357 is that shipping and storing ammonia and carbon dioxide is costly and involves high pressure and/or low temperature. Further, transportation of ammonia and/or carbon dioxide in small amounts tends to be expensive as the process involves shipping small containers filled with the reagents to a zinc processing station and then shipping empty containers back to the ammonia and/or carbon dioxide supplier. The cost of shipping a large amount of carbon dioxide and/or ammonia is lower, but this involves substantial investment in storage and handling facilities. The large amount also exceeds the requirement of the zinc processing facilities.

SUMMARY OF THE INVENTION

In accordance with the present invention, it is an object to provide a method for preparing zinc carbonate from zinc ash using a urea solution. A series of heating and filtering steps are used to remove various contaminating metals and to precipitate the final basic zinc carbonate product. Alternatively, rather than a series of heating steps, the pH of the solution is selectively adjusted to facilitate the removal of iron and to harvest the basic zinc carbonate.

In accordance with the present invention, a method is provided for producing basic zinc carbonate. The method includes heating a solution made from urea with added zinc ash in a vessel to produce zinc-ammonia-carbonate complex $(Zn(NH_3)_xCO_3$, where x can be 2, 4 or 6 depending on the concentration of ammonia) and impurities dissolved in a solution and a residual. The solution is cemented by adding the zinc dust to form a slurry. The slurry is filtered to remove a first precipitate and to produce a first filtrate. The first filtrate is heated to form a second precipitate in the first filtrate. The first filtrate is filtered to remove the second precipitate and to produce a second filtrate. The second filtrate is heated to form a third precipitate comprising basic zinc carbonate. The basic zinc carbonate is harvested and washed.

In accordance with another aspect of the present invention, a method is provided for producing basic zinc carbonate. A solution made from urea with zinc ash is heated in a vessel to produce a zinc-ammonia-carbonate complex solution and impurities dissolved in the solution and a residual. The solution is cemented with zinc dust to form a slurry. The slurry is filtered to remove a first precipitate comprising heavy metals, some zinc value, and iron and to produce a first filtrate. The first filtrate is heated to form a second precipitate in the first filtrate. The first filtrate is filtered to remove the second precipitate comprising iron hydroxide and some zinc value to produce a second filtrate. The second filtrate is heated to form a third precipitate comprising basic zinc carbonate. The basic zinc carbonate is washed, dried, and milled.

In accordance with another aspect of the present invention, a method is provided for producing basic zinc carbonate. The method includes heating a solution made from urea with added zinc ash in a vessel from 90° C. to 150° C. to produce zinc-ammonia-carbonate complex and impurities dissolved in the solution and a residual. The solution is cemented with zinc dust to form a slurry. The slurry is filtered to remove a first precipitate and to produce a first filtrate. The pH of the first filtrate is adjusted to 10 or above to form a second precipitate comprising iron in the first filtrate. The first filtrate is filtered to remove the second precipitate and to produce a second filtrate. The pH of the second filtrate is adjusted to below 10 to form a third precipitate comprising zinc carbonate. The zinc carbonate is washed, dried, and milled.

A feature of the present invention concerns the use of urea in the preparation of zinc carbonate from zinc ash. An advantage to using urea rather than ammonia and carbon dioxide is that urea tends to be safer and easier to ship than ammonia and carbon dioxide and does not require special vehicles and equipment. Further, ammonia and carbon dioxide are transported in a dehydrated, solid form. In addition, urea is in a more concentrated form than ammonia and carbon dioxide. For example, urea has a molecular weight of 60 where one urea molecule can react with water to form two ammonia molecules and one carbon dioxide molecule for a total molecular weight of 78. Consequently, one can transport 60 parts solid urea instead of 78 parts compressed gasses (i.e., ammonia and carbon dioxide) which tend to be hazardous and expensive to ship.

An additional feature of the present invention concerns the reuse of ammonia and carbon dioxide evolved during the reaction of zinc ash with urea or the ammonia evolved during the precipitation of basic zinc carbonate by heating. These evolved gasses of ammonia and carbon dioxide are reintroduced to the zinc ash/urea solution. Additional external ammonia gas and/or carbon dioxide (i.e., gasses not evolved during the reaction of zinc ash with urea) may be added to the zinc ash/urea solution. An advantage of reintroducing ammonia and carbon dioxide to the zinc ash/urea solution is to conserve reagents and to further decompose the zinc ash.

Further features and advantages of the present invention will be set forth in, or apparent from, the detailed description of preferred embodiments thereof which follows.

BRIEF DESCRIPTION OF THE DRAWING

The sole FIGURE is a schematic flow sheet of an embodiment of the invention for preparing zinc carbonate.

DETAILED DESCRIPTION OF THE INVENTION

The preferred embodiment of the invention is illustrated by the flow sheet depicted in the FIGURE. Urea is dissolved in water and/or recycled spent filtrate from precipitating basic zinc carbonate at dissolving tank 1. Ammonia and/or carbon dioxide can also be optionally added to this solution of dissolving tank 1. The solution is then pumped to a closed vessel 2 with zinc ash, zinc skimming or other waste zinc materials (collectively referred to as zinc ash).

The closed vessel 2 is then heated to a temperature of 90° C. to 150° C. and maintained there for a period of time to dissolve the zinc ash. Much of the heavy metals and iron in the zinc ash also dissolve into the solution.

Optimally, the molar ratio of ammonia to carbon dioxide in closed vessel 2 ranges from 2:1 to 15:1 with recycled or freshly supplied ammonia, carbon dioxide and optionally with urea. The heating of the zinc ash solution in closed vessel 2 may be effected at 10° C. to 150° C.

Pure urea solution without the presence of zinc ash decomposes only very slowly, even at 140° C., into ammonia and carbon dioxide. At temperature lower than 90° C., the decomposition of urea is too slow, even at the presence of zinc ash, to form the zinc-ammonia-carbonate complex at a reasonably rapid rate. The presence of the recycled ammonia and carbon dioxide thus lower the reaction temperature from 90° C. to 10° C.

Optionally, external ammonia can be added to the dissolving tank 1. The external ammonia may include liberated ammonia generated externally by reacting lime with ammonium chloride resulting in calcium chloride and ammonia gas. The ammonia gas is introduced into the dissolving tank 1 and calcium chloride produced is recovered as a commercial product.

The zinc-ammonia-carbonate complex solution is filtered through filter 3 and transferred to vessel 4 for cooling. Zinc dust is added to the solution in vessel 4 using heavy agitation (for example, approximately 350 rpm using a 10 inch diameter propeller from Inco Co. of New Albany, Ind. in a 3 ft diameter×4 ft vessel) to precipitate the heavy metals and some of the iron. The solution is filtered through filter 5 into vessel 6 and the precipitate is discarded. The filtrate is then heated in vessel 6 to precipitate iron as iron hydroxide. Any conventional heating and filtration equipment may be utilized. Typically, a jacketed stainless steel vessel is used for heating the solution. The filter is usually a washable filter press, stainless steel or polypropylene filter plates.

Alternatively, the heating process in vessel 6 can be replaced by adjusting the pH of the zinc-ammonia-carbonate complex solution in vessel 6 to a pH of 10 or above to facilitate the precipitation of iron hydroxide.

The iron hydroxide precipitate is filtered through filter 7 into heating tank 8. The clear solution is then heated in heating tank 8 to drive out the ammonia and/or carbon dioxide and to precipitate basic zinc carbonate in the form of $ZnCO_3 \cdot xZn(OH)_2$ where x is from 1 to 2. Alternatively, the heating in tank 8 can be replaced by adjusting the pH of the zinc solution to less than 10, thereby forming the basic zinc carbonate precipitate.

Heating the filtrate in heating tank 8 to precipitate zinc carbonate or the pH of the filtrate in heating tank 8 is lowered to below 10 and preferably to around 7.8 by bubbling $CO_2$ into the solution for separation of zinc carbonate. The precipitated zinc carbonate is then filtered and washed free of soluble matter in filter 9 and dried in dryer 10, typically a rotary dryer, at about 105° C. The dried zinc carbonate is milled in a mill 11, such as a Makron type fine-impact mill, and ready for use like the conventional zinc carbonate made from soda ash and zinc sulfate. The zinc carbonate can also further be calcined at 600° C. into the active zinc oxide, which is a very fine particle size zinc oxide from the decomposition of zinc carbonate.

The filtrate obtained after filtering the precipitated zinc carbonate at filter 9 is returned to the urea dissolving tank 1 and reused together with any liberated ammonia and/or carbon dioxide whenever it is economically feasible. When it is not convenient or economical to do so, new urea is added to the solution together with some carbon dioxide if needed. The cycle is then repeated and more zinc ash is heated with the solution and dissolved in the closed vessel 2.

The method of the invention provides advantages over prior art methods of preparing zinc carbonate from zinc bearing flue dust. The present method provides for the use of urea to react with zinc at a temperature whereby ammonia and carbon dioxide are released. As a result, the released ammonia and carbon dioxide then react with the zinc ash at a commercially viable rate. Further, the present method uses zinc ash as both a reactant and as a catalyst enhancing the decomposition of urea.

Further details and understanding of the present invention are provided with reference to the following examples.

EXAMPLE 1

120 grams of urea were dissolved in a beaker with 400 ml of water. 120 grams of zinc ash containing 70% zinc by weight was put into a stainless steel vessel together with the urea solution. The stainless steel vessel was closed and the contents heated to 140° C. and held for 60 minutes at this temperature. The vessel was periodically shaken to provide agitation. After the 60 minutes, the contents of the vessel were allowed to cool to room temperature. The vessel was opened and the solution was poured through a filter. 2 grams of zinc dust were added to resultant filtered solution ("Solution A"), which was agitated and filtered. The filtrate ("Solution B") was heated to 90° C. and shaken well. The resultant reddish yellow precipitate, which contained most of the iron in the solution and a fair amount of zinc, was filtered and discarded. The filtrate ("Solution C") was heated to 95° C. The resultant precipitate was filtered and washed. The precipitate was dried at 110° C. to obtain 40.2 grams of zinc carbonate. The filtrate obtained after precipitating zinc carbonate, and the gases recovered at the two heating cycles contained ammonia and/or carbon dioxide or urea. This filtrate may be used again, with or without additional urea, to dissolve more zinc ash.

Table 1 includes the percentages of zinc, iron and heavy metals in zinc ash, Solutions A–C and in the final zinc carbonate product:

TABLE 1

| | Zinc | Solution | | | zinc |
| --- | --- | --- | --- | --- | --- |
| Materials | Ash | A | B | C | carbonate |
| Zinc | 70% | 7.2% | 7.2% | 7.2% | 53.8% |
| Iron | .7% | — | — | — | 0.0038% |
| Heavy metals as lead | .43% | — | — | — | less than 0.001% |

EXAMPLE 2

240 grams of urea were dissolved in a beaker with 400 ml of water. 60 grams of zinc ash containing 70% zinc was put into a stainless steel vessel no. 1 together with the urea solution. The stainless steel vessel no. 1 was closed and the contents heated to 140° C. and held for 90 minutes. Vessel no. 1 was periodically shaken to provide agitation. While heating proceeded, the pressure in vessel no. 1 was controlled at 100 psi by bubbling the gas evolved from vessel no. 1 into a closed stainless steel vessel no. 2 containing 400 ml of water and 120 grams of zinc ash at room temperature. Vessel no. 2 was shaken periodically to agitate the contents. The temperature of stainless steel vessel no. 2 eventually reached 86° C. Gas, which was mostly carbon dioxide, had to be released periodically into the atmosphere from stainless steel vessel no. 2 to keep its pressure below 100 psi. After the 90 minutes, the contents of vessel no. 1 were allowed to cool to room temperature. Vessel no. 1 was opened and the solution poured through a filter. It was determined that the filtered solution ("Solution D") contained 9.6% zinc and weighed 335 grams. The solution ("Solution E") was removed from stainless steel vessel no. 2 and it was determined that Solution E contained 7.6% zinc and weighed 685 grams. After the zinc dust and iron purification steps, 58.4 grams of zinc carbonate was obtained from solution E.

EXAMPLE 3

Example 2 was repeated and the resultant solution from vessel no. 2 ("Solution E2") was determined to weigh 713 grams with 7.4% zinc. The pH of solution E2 was measured as 9.4 with 200 ppm iron. Solution E2 was filtered and the pH adjusted to 10.8 by adding ammonia or caustic soda to form solution F. Solution F was allowed to stand overnight and a red precipitate resulted. The red precipitate was filtered out to form solution G. 2 grams of zinc dust was added to solution G, which was agitated and then filtered. Carbon dioxide was bubbled into the filtrate ("Solution H") to lower the pH to 7.8. White precipitate appeared. The white precipitate was filtered, washed and dried as in Example 1. The precipitate was determined to contain 84.6 grams of zinc carbonate. Both heavy metal content and iron content in the zinc carbonate were found to be less than 10 ppm. The recovery of zinc from solution E was 86% in Example 3 versus 62% in Example 2.

EXAMPLE 4

Example 2 was repeated, but instead of releasing the carbon dioxide gas at stainless steel vessel No. 2 into the atmosphere, the carbon dioxide gas was released into stainless steel vessel No. 3 containing ammonia gas, 400 ml of ammonia water and 120 gram of zinc ash. The ammonia gas and ammonia water were prepared by heating 150 grams of ammonium chloride and 1354 grams of milky lime with 6.2% CaO in a glass flask. The evolved ammonia gas was bubbled into vessel no. 3. Vessel no. 3 was shaken periodically to give good agitation to its contents inside. After heating vessel no. 1, vessel no. 3 was allowed to cool to room temperature. The solution ("Solution J") in vessel no. 3 was poured out and treated in the same manner as solution E2 in Example 3. 61.8 grams of basic zinc carbonate was obtained. The slurry in the glass flask was filtered to remove the excess lime. Hydrochloric acid was added to the calcium chloride filtrate to adjust the pH from 10.3 to 7.5. The filtrate was boiled to form a 75% calcium chloride solution. The hot 75% calcium chloride solution was poured onto a glass plate and allowed to cool and solidify. 198.6 grams of granular calcium chloride with the following composition was obtained, where all percentages are based on weight:

|  | Sample Prepared In Accordance With The Invention | Commercial Sample |
|---|---|---|
| $CaCl_2$ | 75.4% | 75.2% |
| NaCl | 1.54% | 1.65% |
| Fe | 0.005% | 0.004% |
| $SO_4$ | 0.13% | 0.9% |
| $H_2O$ | balance | balance |

The purity of the calcium chloride was comparable to industrial grade calcium chloride in the market.

EXAMPLE 5

The zinc carbonate obtained in Example 3 was divided into two parts. The first part was ground into fine zinc carbonate powder. The second part was calcined at 500° C. and then ground into fine powder active zinc oxide. Together with white seal zinc oxide, also known as French process zinc oxide manufactured and sold by Univenture Public Co. Ltd., Bangkok, Thailand, both were then used in three rubber formulations (Recipes 1–3) as shown in Table 2:

TABLE 2

|  |  | Recipe 1 | Recipe 2 | Recipe 3 |
|---|---|---|---|---|
| 1 | Materials | \- parts per hundred rubber parts (by weight)- | | |
| 2 | Natural Rubber, TTR-5L | 80 | 80 | 80 |
| 3 | Buta Dieng Rubber BR-0150 | 20 | 20 | 20 |
| 4 | Carbon Black, HAF-N660 | 45 | 45 | 45 |
| 5 | China clay | 60 | 60 | 60 |
| 6 | Stearic Acid | 1.5 | 1.5 | 1.5 |
| 7 | Aromatic Oil | 10 | 10 | 10 |
| 8 | Paraffin Wax | 1 | 1 | 1 |
| 9 | Anti Oxidant, Flectol Flake | 1 | 1 | 1 |
| 10 | CBS | 0.8 | 0.8 | 0.8 |
| 11 | TMTD | 0.2 | 0.2 | 0.2 |
| 12 | Active zinc oxide* | 3.5 | — | — |
| 13 | Zinc carbonate* | — | 5 | — |
| 14 | white seal zinc oxide* | — | — | 5 |
| 15 | Sulfur | 2.4 | 2.4 | 2.4 |

*serving as activators in the recipe

After the rubber samples were cured at 150° C. for 7 minutes, their tensile strength, hardness, and modulus at 300% were measured and compared. The performance of both active zinc oxide (recipe 1) and zinc carbonate (recipe 2) was substantially the same or better than white seal zinc oxide (recipe 3) although the amount of pure zinc was much less.

Although the invention has been described above in relation to preferred embodiments thereof, it will be understood by those skilled in the art that variations and modifications can be effected in these preferred embodiments without departing from the scope and spirit of the invention.

What is claimed is:

1. A method of producing basic zinc carbonate, comprising:
   heating a solution made from urea with added zinc ash in a vessel to produce zinc and impurities dissolved in the solution and a residual;
   cementing the solution by adding zinc dust to form a slurry;
   filtering the slurry to remove a first precipitate and to produce a first filtrate;
   heating the first filtrate to form a second precipitate in the first filtrate;
   filtering the first filtrate to remove the second precipitate and to produce a second filtrate;

heating the second filtrate to form a third precipitate comprising basic zinc carbonate;

harvesting the basic zinc carbonate; and washing the basic zinc carbonate.

2. The method according to claim 1, further comprising drying and milling the basic zinc carbonate after said washing.

3. The method according to claim 1, wherein said solution made from urea with zinc ash is heated at a temperature of 90° C. to 150° C.

4. The method according to claim 1, wherein the vessel comprises a closed vessel.

5. The method according to claim 1, wherein the first precipitate comprises heavy metals, iron, and a zinc precipitate.

6. The method according to claim 1, wherein the second precipitate comprises iron hydroxide and a zinc precipitate.

7. The method according to claim 1, wherein the solution of urea further comprises one of ammonia, carbon dioxide, ammonium carbonate and ammonium bicarbonate.

8. The method according to claim 1, further comprising forming a second solution comprising one of ammonia, carbon dioxide, ammonium carbonate and ammonium bicarbonate, and optionally with urea, and wherein said solution made from urea with added zinc ash is heated at a temperature from 10° C. to 150° C.

9. The method according to claim 1, wherein the zinc ash comprises additional waste zinc materials.

10. The method according to claim 1, wherein the zinc ash is both a reactant and a catalyst enhancing the decomposition of urea.

11. The method according to claim 1, further comprising:

preparing ammonia from ammonium chloride and lime;

obtaining carbon dioxide recycled as product produced from said heating a solution made from urea with added zinc ash or from a fresh supply;

reacting the zinc ash with the ammonia and carbon dioxide; and harvesting commercial grade calcium chloride obtained from the reaction of lime and ammonium chloride.

12. The method according to claim 1, wherein the basic zinc carbonate is of a grade comparable to white seal zinc oxide and suitable for rubber compounding and rubber latex applications with respect to tensile strength and hardness and modulus at 300%.

13. The method according to claim 1, further comprising calcining the basic zinc carbonate to form active zinc oxide calcined from the zinc carbonate of a grade better than white seal zinc oxide suitable for rubber compounding and rubber latex applications with respect to tensile strength and hardness and modulus at 300%.

14. A method of producing zinc carbonate, comprising:

heating a solution made from urea with zinc ash in a vessel to produce a zinc value and impurities dissolved in the solution and a residual;

cementing the solution with zinc dust to form a slurry;

filtering the slurry to remove a first precipitate comprising heavy metals and iron and to produce a first filtrate;

heating the first filtrate to form a second precipitate comprising iron in the first filtrate;

filtering the first filtrate to remove the second precipitate and to produce a second filtrate;

heating the second filtrate to form a third precipitate comprising basic zinc carbonate;

harvesting the basic zinc carbonate; and washing, drying, and milling the basic zinc carbonate.

15. The method according to claim 14, wherein said solution made from urea with zinc ash is heated at a temperature of 90° C. to 150° C.

16. The method according to claim 14, wherein the vessel comprises a closed vessel.

17. The method according to claim 14, wherein the solution of urea further comprises one of ammonia, carbon dioxide, ammonium carbonate and ammonium bicarbonate.

18. A method of producing zinc oxide, comprising:

heating a solution made from urea with added zinc ash in a vessel to produce zinc and impurities dissolved in the solution and a residual;

cementing the solution by adding zinc dust to form a slurry;

filtering the slurry to remove a first precipitate and to produce a first filtrate;

heating the first filtrate to form a second precipitate in the first filtrate;

filtering the first filtrate to remove the second precipitate and to produce a second filtrate;

heating the second filtrate to form a third precipitate comprising-basic zinc carbonate;

harvesting the basic zinc carbonate;

washing the basic zinc carbonate; and calcining the basic zinc carbonate to form the zinc oxide.

19. The method according to claim 18, wherein the zinc oxide has a BET surface area of approximately 40m$^2$ per gram and a particle size of less than 40 nanometers.

20. The method according to claim 18, further comprising forming a second solution comprising one of ammonia, carbon dioxide, ammonium carbonate and ammonium bicarbonate, and optionally with urea, and wherein said solution made from urea with zinc ash is heated at a temperature from 10° C. to 150° C.

21. The method according to claim 18, further comprising:

preparing ammonia from ammonium chloride and lime;

obtaining carbon dioxide recycled as product produced from said heating a solution made from urea with added zinc ash or from a fresh supply;

reacting the zinc ash with the ammonia and carbon dioxide; and harvesting commercial grade calcium chloride obtained from the reaction of lime and ammonium chloride.

22. A method of producing zinc oxide, comprising:

heating a first solution made from urea with added zinc ash in a first vessel to form a first solution;

bubbling gas evolved from the first vessel into a second vessel containing a second solution of zinc ash in water to form zinc and impurities dissolved in the second solution;

cementing the second solution by adding zinc dust to form a slurry;

filtering the slurry to remove a first precipitate and to produce a first filtrate;

heating the first filtrate to form a second precipitate in the first filtrate;

filtering the first filtrate to remove the second precipitate and to produce a second filtrate;

heating the second filtrate to form a third precipitate comprising basic zinc carbonate;

harvesting the basic zinc carbonate;

washing the basic zinc carbonate; and calcining the basic zinc carbonate to form the zinc oxide.

* * * * *